(12) United States Patent
Lung et al.

(10) Patent No.: US 10,218,261 B2
(45) Date of Patent: Feb. 26, 2019

(54) GRID CONNECTION POWER CONVERSION DEVICE AND START-UP CONTROL METHOD THEREFOR

(71) Applicant: Tabuchi Electric Co., Ltd., Yodogawa-ku, Osaka (JP)

(72) Inventors: Chienru Lung, Osaka (JP); Hideki Hidaka, Osaka (JP)

(73) Assignee: Tabuchi Electric Co., Ltd., Osaka (JP)

( * ) Notice: Subject to any disclaimer, the term of this patent is extended or adjusted under 35 U.S.C. 154(b) by 0 days.

(21) Appl. No.: 15/432,966

(22) Filed: Feb. 15, 2017

(65) Prior Publication Data
US 2017/0346389 A1 Nov. 30, 2017

(30) Foreign Application Priority Data
May 27, 2016 (JP) ................................. 2016-106060

(51) Int. Cl.
*H02M 1/36* (2007.01)
*H02J 3/38* (2006.01)
(Continued)

(52) U.S. Cl.
CPC ............... *H02M 1/36* (2013.01); *H02J 3/385* (2013.01); *H02J 3/42* (2013.01); *H02M 1/126* (2013.01);
(Continued)

(58) Field of Classification Search
CPC ............... H02M 3/3376; H02M 3/337; H02M 3/33592; H02M 3/3372; H02M 3/3378; H02M 3/28; H02M 3/33569; H02M 3/33507; H02M 3/33523; H02M 3/3384; H02M 7/53806; H02M 7/53871; H02M 7/5387; H02M 7/53875; H02M 7/537; H02M 7/003; H02M 7/538; H02M 7/53835; H02M 7/5381; H02M 7/53846;
(Continued)

(56) References Cited

U.S. PATENT DOCUMENTS 9,654,028 B1 * 5/2017 Luo .................. H02M 7/537
9,680,364 B2 * 6/2017 Khajehoddin .......... H02M 1/12
(Continued)

FOREIGN PATENT DOCUMENTS

| JP | 2005-318704 A | 11/2005 |
|---|---|---|
| JP | 2014-64415 A | 4/2014 |
| JP | 2015-27146 A | 2/2015 |

*Primary Examiner* — Jue Zhang
*Assistant Examiner* — Kevin H Sprenger
(74) *Attorney, Agent, or Firm* — Crowell & Moring LLP

(57) ABSTRACT

A grid connection power conversion device is provided in which an amplitude of an output voltage from an inverter is increased stepwise from 0, after start-up of the power conversion device, to adjust the amplitude of the output voltage from the inverter to match an amplitude of a commercial system voltage as detected, and thereafter the inverter is connected to the commercial power system to start grid-connected operation. This makes it possible to prevent the voltage applied to a capacitor provided between the inverter and the commercial power system from abruptly increasing from 0V to the commercial system voltage at the start-up of the power conversion device, thereby making it possible to reduce an inrush current to the capacitor at the start-up without using an inrush current prevention circuitry.

7 Claims, 8 Drawing Sheets

(51) Int. Cl.
  *H02M 3/04* (2006.01)
  *H02M 7/5387* (2007.01)
  *H02M 1/12* (2006.01)
  *H02M 1/32* (2007.01)
  *H02J 3/42* (2006.01)

(52) U.S. Cl.
  CPC .............. *H02M 1/32* (2013.01); *H02M 3/04* (2013.01); *H02M 7/5387* (2013.01)

(58) Field of Classification Search
  CPC ...... H02M 5/4585; H02M 5/458; H02M 5/45; H02M 5/4505; H02M 1/12; H02M 1/36; Y02B 70/1475; Y02B 70/1433; Y02B 70/126; Y02B 70/1441; H02J 9/062
  USPC ...... 363/17, 24–26, 34, 37, 97–98, 131–134
  See application file for complete search history.

(56) References Cited

U.S. PATENT DOCUMENTS

| | | | | |
|---|---|---|---|---|
| 2004/0084965 A1* | 5/2004 | Welches | ............... | H02J 3/01 307/64 |
| 2006/0171182 A1* | 8/2006 | Siri | ............... | H02M 3/33592 363/131 |
| 2012/0087158 A1* | 4/2012 | Chapman | ............... | H02M 7/537 363/37 |
| 2014/0307494 A1* | 10/2014 | Wu | ............... | H02M 7/48 363/97 |
| 2017/0155342 A1* | 6/2017 | Deboy | ............... | H02M 7/53871 |

* cited by examiner

GRID CONNECTION POWER CONVERSION DEVICE AND START-UP CONTROL METHOD THEREFOR

CROSS-REFERENCE TO RELATED APPLICATION

This application is based on and claims the benefit of priority of the prior Japanese Patent Application No. 2016-106060, filed on May 27, 2016, the entire contents of which are incorporated herein by reference.

BACKGROUND OF THE INVENTION

1. Field of the Invention

The present invention relates to a grid connection power conversion device (that is, power conversion device for grid connection) applicable to a distributed power supply, and also relates to a start-up control method for the power conversion device.

2. Description of the Related Art

Conventionally, in order to use a distributed power supply such as a solar cell and a fuel cell by connecting it to a commercial power system, a power conversion device such as a power conditioner is required to convert DC power generated by the distributed power supply to AC power, which can be connected to the commercial power system. If the distributed power supply is a solar cell, the power conditioner performs Maximum Power Point Tracking (hereafter referred to as MPPT) control to regulate an input voltage from the solar cell so as to maximize (optimize) the output voltage from the solar cell. More specifically, the power conditioner comprises: a DC/DC converter for increasing or decreasing the input voltage from the solar cell to a predetermined voltage to increase or decrease the DC output voltage (DC bus voltage $V_{dc}$) within a certain range; and an inverter for converting the DC power output from the DC/DC converter to AC power.

The inverter comprises switching elements such as IGBTs (Insulated Gate Bipolar Transistors) which are switched by a PWM (Pulse Width Modulation) signal sent from a control unit of the power conditioner. In order to remove the carrier of the PWM signal, the power conditioner comprises an LC (inductor-capacitor) filter for removing high frequency components, which is provided between the inverter and the commercial power system. When the inverter of the power conditioner is connected to the commercial power system at start-up of the power conditioner, the voltage applied to the capacitor of the LC filter abruptly increases from 0V to the commercial system voltage. Therefore, an inrush current may flow in the capacitor to cause a contact of a grid connection relay (that is, relay for grid connection) to be welded, and it is considered that other circuitry elements (such as the switching elements of the inverter) in the power conditioner may be broken.

Thus, in order to reduce an inrush current to the capacitor, a power conversion device is known which has an inrush current prevention circuitry formed by a parallel circuitry of a switch and a resistor and connected in series to the capacitor, and which is designed to detect a failure of the switch in the inrush current prevention circuitry, as described in Japanese Laid-open Patent Publication 2015-027146. Further, in this kind of power conversion device, as described in Japanese Laid-open Patent Publication 2014-064415, it is known to output a control signal to a relay (second switch 16) for isolated power system to bring the relay to an open state, and also output a test voltage V3 from an inverter (power conversion unit 13) so as to detect welding of a contact of the relay for isolated power system (welding between internal terminals of the second switch 16) based on a voltage value of a terminal for isolated operation as then detected by a voltage detection unit of the isolated power system. Furthermore, in this kind of power conversion device, as described in Japanese Laid-open Patent Publication 2005-318704, it is known to use a change rate of an applied voltage to a capacitor, without adding an exclusive current detection sensor, to detect a short circuit of a switching element of a power converting section when both upper and lower arms of the switching element are turned on at the same time due to conduction failure or control abnormality of the switching element.

However, these power conversion devices have the following problems. In the power conversion device (power conditioner) described in Japanese Laid-open Patent Publication 2015-027146, it is necessary to newly provide an inrush current prevention circuitry formed by a parallel switch and a resistor and the like, and therefore the manufacturing cost of the power conversion device increases. Further, in the power conversion device described in Japanese Laid-open Patent Publication 2014-064415, it is possible to detect welding of a contact of a relay for isolated power system, but it is not possible to reduce an inrush current to the capacitor of the LC filter (provided between the inverter and the commercial power system). Furthermore, in the power conversion device described in Japanese Laid-open Patent Publication 2005-318704, it is possible to detect a short circuit of the switching element, but it is not possible to reduce an inrush current to the capacitor of the LC filter.

BRIEF SUMMARY OF THE INVENTION

An object of the present invention is to solve the problems described above, and to provide a grid connection power conversion device and a start-up control method for the grid connection power conversion device which make it possible to reduce an inrush current to a capacitor connected between an inverter and a commercial power system at start-up of the power conversion device without using an inrush current prevention circuitry.

According to a first aspect of the present invention, this object is achieved by a grid connection power conversion device for connecting a distributed power supply to a commercial power system, the grid connection power conversion device comprising: an inverter for converting DC power based on power input from the distributed power supply to AC power; a capacitor connected between the inverter and the commercial power system; a commercial voltage amplitude detection circuitry configured to detect an amplitude of a commercial system voltage which is a voltage of the commercial power system; an amplitude adjustment circuitry configured to increase an amplitude of an output voltage from the inverter stepwise from 0 to match the amplitude of the commercial system voltage detected by the commercial voltage amplitude detection circuitry; and a start-up control circuitry configured to control the grid connection power conversion device so that after the amplitude adjustment circuitry adjusts the amplitude of the output voltage from the inverter, after the start-up of the grid connection power conversion device, to match the amplitude of the commercial system voltage detected by the commercial voltage amplitude detection circuitry, the start-up control circuitry connects the inverter to the commercial power system to start grid-connected operation.

It is preferred that the grid connection power conversion device further comprises a commercial voltage phase angle detection circuitry configured to detect a phase angle of the commercial system voltage, and a phase angle adjustment circuitry configured to adjust a phase angle of the output voltage from the inverter to allow a phase difference between the phase angle of the output voltage from the inverter and the phase angle of the commercial system voltage detected by the commercial voltage phase angle detection circuitry to have a value within a predetermined range, therein the start-up control circuitry controls the grid connection power conversion device so that after the phase angle adjustment circuitry adjusts the phase angle of the output voltage from the inverter, after the start-up of the grid connection power conversion device, so as to allow the phase difference to have a value within a predetermined range, the start-up control circuitry connects the inverter to the commercial power system to start the grid-connected operation.

It is preferred that the grid connection power conversion device further comprises a grid connection switch for switching the connection of the distributed power supply to the commercial power system between a connected state and a disconnected state, an output current value detection circuitry configured to detect a value of an output current from the inverter, a passing current value estimation circuitry configured to estimate a value of a capacitor-passing current which is a current flowing through the capacitor, a system output current value calculation circuitry configured to calculate a value of an output current from the grid connection power conversion device based on the value of the output current from the inverter detected by the output current value detection circuitry and the value of the capacitor-passing current estimated by the passing current value estimation circuitry, and a disconnection/welding detection circuitry configured to detect disconnection of the grid connection switch, before starting the grid-connected operation, based on the value of the output current from the grid connection power conversion device as calculated by the system output current value calculation circuitry, with the grid connection switch switched to the connected state, and also configured to detect welding of the grid connection switch, before starting the grid-connected operation, based on the value of the output current from the grid connection power conversion device as calculated by the system output current value calculation circuitry, with the grid connection switch switched to the disconnected state.

It is preferred that the grid connection power conversion device further comprises an output voltage value detection circuitry configured to detect a value of the output voltage from the inverter, therein the passing current value estimation circuitry calculates the value of the capacitor-passing current based on the value of the output voltage from the inverter as detected by the output voltage value detection circuitry so as to estimate the value of the capacitor-passing current.

In the grid connection power conversion device, it is preferred that the system output current value calculation circuitry repeatedly calculates the value of the output current from the grid connection power conversion device, with the grid connection switch switched to the disconnected state, and the disconnection/welding detection circuitry detects that welding occurs in the grid connection switch if the values of the output current calculated multiple times in the past are all equal to or more than a predetermined threshold and continuously increase, therein if the value of the output current calculated by the system output current value calculation circuitry, with the grid connection switch switched to the connected state, is less than the predetermined threshold, the disconnection/welding detection circuitry detects that disconnection occurs in the grid connection switch.

According to a second aspect of the present invention, the above object is achieved by a start-up control method for a grid connection power conversion device comprising: an inverter for converting DC power based on power input from a distributed power supply to AC power; and a capacitor connected between the inverter and the commercial power system, the start-up control method comprising the steps of: increasing an amplitude of an output voltage from the inverter stepwise from 0, after start-up of the grid connection power conversion device, to adjust the amplitude of the output voltage from the inverter to match an amplitude of a commercial system voltage; and thereafter connecting the inverter to the commercial power system to start grid-connected operation.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that the drawings are shown for the purpose of illustrating the technical concepts of the present invention or embodiments thereof, wherein.

DETAILED DESCRIPTION OF THE INVENTION

Figure 1:
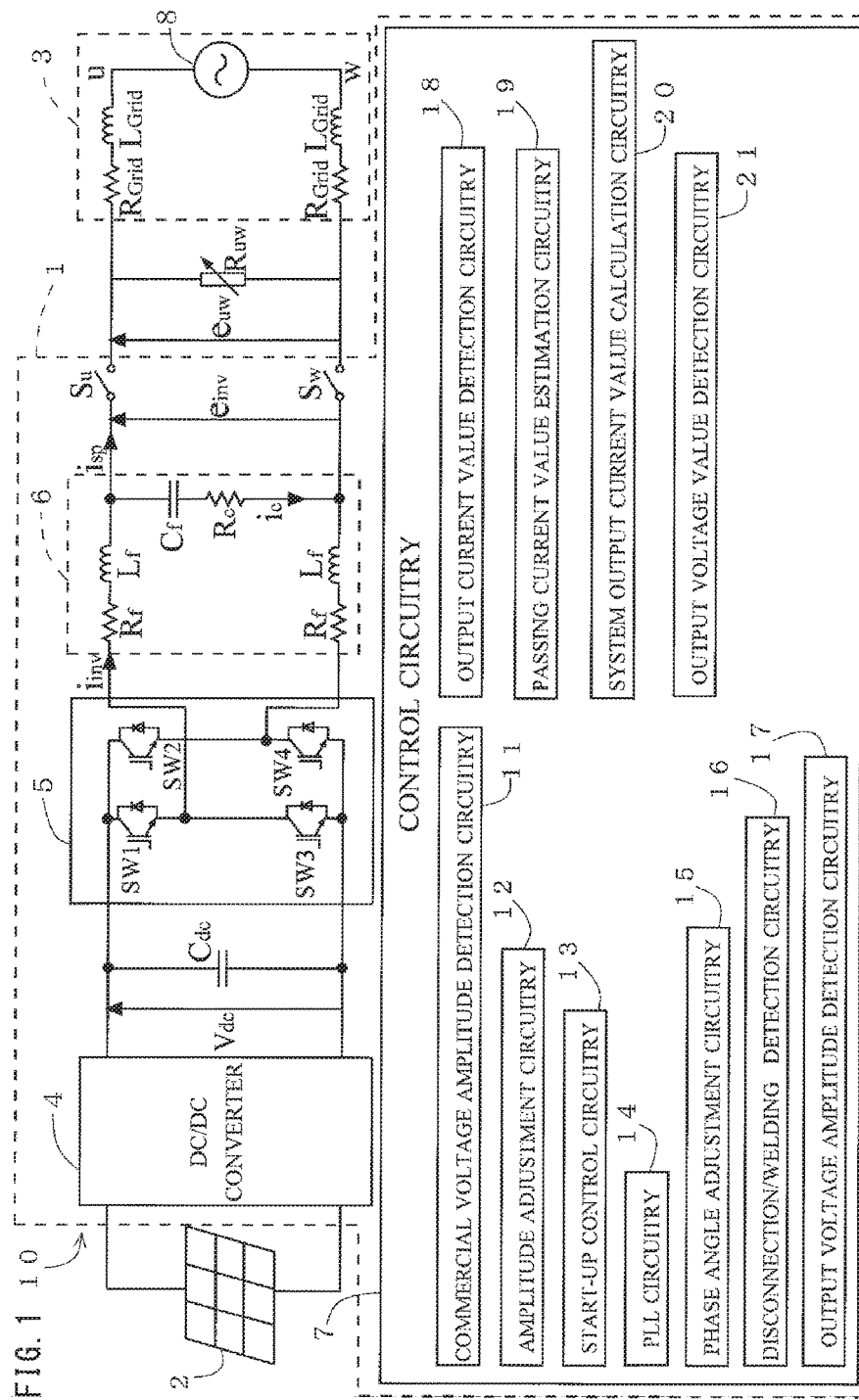
FIG. 1 is a schematic circuit diagram, partially in block form, showing an outline of a solar photovoltaic power generation system including a power conditioner (grid connection power conversion device) according to an exemplary embodiment of the present invention.

Hereinafter, a grid connection power conversion device and a start-up control method for the grid connection power conversion device according to an exemplary embodiment of the present invention will be described with reference to the drawings. The present embodiment shows an example where the claimed grid connection power conversion device is a power conditioner. FIG. 1 is a schematic circuit diagram, partially in block form, showing an outline of a solar photovoltaic power generation system 10 including a power conditioner (grid connection power conversion device) 1 according to the exemplary embodiment. The solar photovoltaic power generation system 10 comprises: a solar cell 2 as a distributed power supply; and the power conditioner 1 for converting DC power generated by the solar cell 2 to AC power, and can be connected (grid-connected) to a commercial power system (commercial power grid) 3. The power conditioner 1 comprises: a DC/DC converter 4; an electrolytic capacitor $C_{dc}$ for smoothing DC bus voltage; an inverter 5; an LC (inductor-capacitor) filter 6; a control circuitry 7; and grid connection relays (that is, relays for grid connection) $S_u$ and $S_w$ (claimed "grid connection switch").

The DC/DC converter 4 performs Maximum Power Point Tracking (hereafter referred to as MPPT) control of the solar cell 2 to adjust an input voltage from the solar cell 2 to maximize (optimize) an output power from the solar cell 2. More specifically, the DC/DC converter 4 increases or decreases the input voltage from the solar cell 2 to a predetermined voltage to increase or decrease the DC output voltage (DC bus voltage $V_{dc}$) within a certain range. The inverter 5 converts the DC power based on the power output from the DC/DC converter 4 to AC power. The inverter 5 comprises switching elements SW1 to SW4 formed by IGBTs (Insulated Gate Bipolar Transistors) which are switched by a PWM (Pulse Width Modulation) signal sent from a control unit of the power conditioner 1. On the other hand, the LC filter 6 comprises two inductors (reactors) $L_f$ each connected in series with each of two power supply lines, and a capacitor $C_f$ connected between the two power supply lines to remove harmonic (high frequency) components (mainly the carrier frequency of the PWM signal) from the AC voltage output from the inverter 5. In FIG. 1, $R_f$ and $R_c$ represent an inner resistance of the inductor $L_f$ and an inner resistance of the capacitor $C_f$, respectively. The capacitor $C_f$ of the LC filter 6 corresponds to the claimed "capacitor connected between the inverter and the commercial power system".

The control circuitry 7 is formed by a so-called microcomputer, and comprises circuitries including a commercial voltage amplitude detection circuitry 11, an amplitude adjustment circuitry 12, a start-up control circuitry 13, a PLL (Phase Locked Loop) circuitry (synchronous circuitry) 14, a phase angle adjustment circuitry 15, a disconnection/welding detection circuitry 16, an output voltage amplitude detection circuitry 17, an output current value detection circuitry 18, a passing current value estimation circuitry 19, a system output current value calculation circuitry 20 and an output voltage value detection circuitry 21. These circuitries 11 to 21 are formed by basic function blocks of the microcomputer. The PLL circuitry 14 corresponds to the claimed commercial voltage phase angle detection circuitry.

The commercial voltage amplitude detection circuitry 11 of the control circuitry 7 is configured to detect an amplitude of a commercial system voltage $e_{uw}$ (line-to-line voltage between the U-phase and the W-phase). The amplitude adjustment circuitry 12 is configured to increase an amplitude of an output voltage $e_{inv}$ from the inverter 5 stepwise from 0 to adjust the amplitude of the output voltage from the inverter 5 to match or follow the amplitude of the commercial system voltage $e_{uw}$ detected by the commercial voltage amplitude detection circuitry 11. The start-up control circuitry 13 is configured to start up and control the hybrid power generation and storage system 1 so that after the amplitude adjustment circuitry 12 adjusts the amplitude of the output voltage $e_{inv}$ from the inverter 5, after the start-up of the power conditioner 1, to match the amplitude of the commercial system voltage $e_{uw}$ detected by the commercial voltage amplitude detection circuitry 11, the start-up control circuitry 13 connects the inverter 5 to the commercial power system 3 so as to allow the power conditioner 1 to smoothly shift to grid-connected operation control (that is, to smoothly start grid-connected operation).

The PLL circuitry 14 is configured to output a signal synchronized with a reference input signal, and is used to generate a voltage signal synchronized with a phase angle $\theta_{uw}$ of the commercial system $e_{uw}$. This PLL circuitry 14 is also used to detect the phase angle $\theta_{uw}$ of the commercial system voltage $e_{uw}$ as will be described later. The phase angle adjustment circuitry 15 is configured to adjust a phase angle of the output voltage $e_{inv}$ from the inverter 5 after (immediately after) the start-up of the power conditioner 1 to allow a phase difference between the phase angle of the output voltage $e_{inv}$ from the inverter 5 and the phase angle $\theta_{uw}$ of the commercial system voltage $e_{uw}$ detected by the PLL circuitry 14 to have a certain value ($\Delta\varphi$ described later). The disconnection/welding detection circuitry 16 is configured to detect disconnection and welding of the grid connection relays $S_u$ and $S_w$. The detection process performed by the disconnection/welding detection circuitry 16 will be described in detail later. The output voltage amplitude detection circuitry 17 detects an amplitude of the output voltage $e_{inv}$ from the inverter 5.

The output current value detection circuitry 18 detects a value of an output current (hereafter referred to as "inverter output current") $i_{inv}$ from the inverter 5. The passing current value estimation circuitry 19 estimates a value of a current (capacitor-passing current) $i_c$ flowing through the capacitor $C_f$. The system output current value calculation circuitry 20 calculates a value of an output current $i_{sp}$ from the power conditioner 1 based on the value of the inverter output current $i_{inv}$ detected by the output current value detection circuitry 18 and the value of the capacitor-passing current $i_c$ estimated by the passing current value estimation circuitry 19. The output voltage value detection circuitry 21 detects a value of the output voltage $e_{inv}$ from the inverter 5.

The grid connection relays $S_u$ and $S_w$ (claimed "grid connection switch") serve as a switch for switching the connection of the solar cell 2 (and the power conditioner 1) to the commercial power system 3 between a connected state and a disconnected state. The commercial power system 3 includes a commercial system power supply 8 and a commercial system (grid) impedance. In FIG. 1, $R_{Grid}$ and $L_{Grid}$ represent a resistance and an inductance (inductive reactance) of the commercial system impedance, respectively, while $R_{uw}$ represents an AC load connected to the commercial power system 3.

Figure 2:
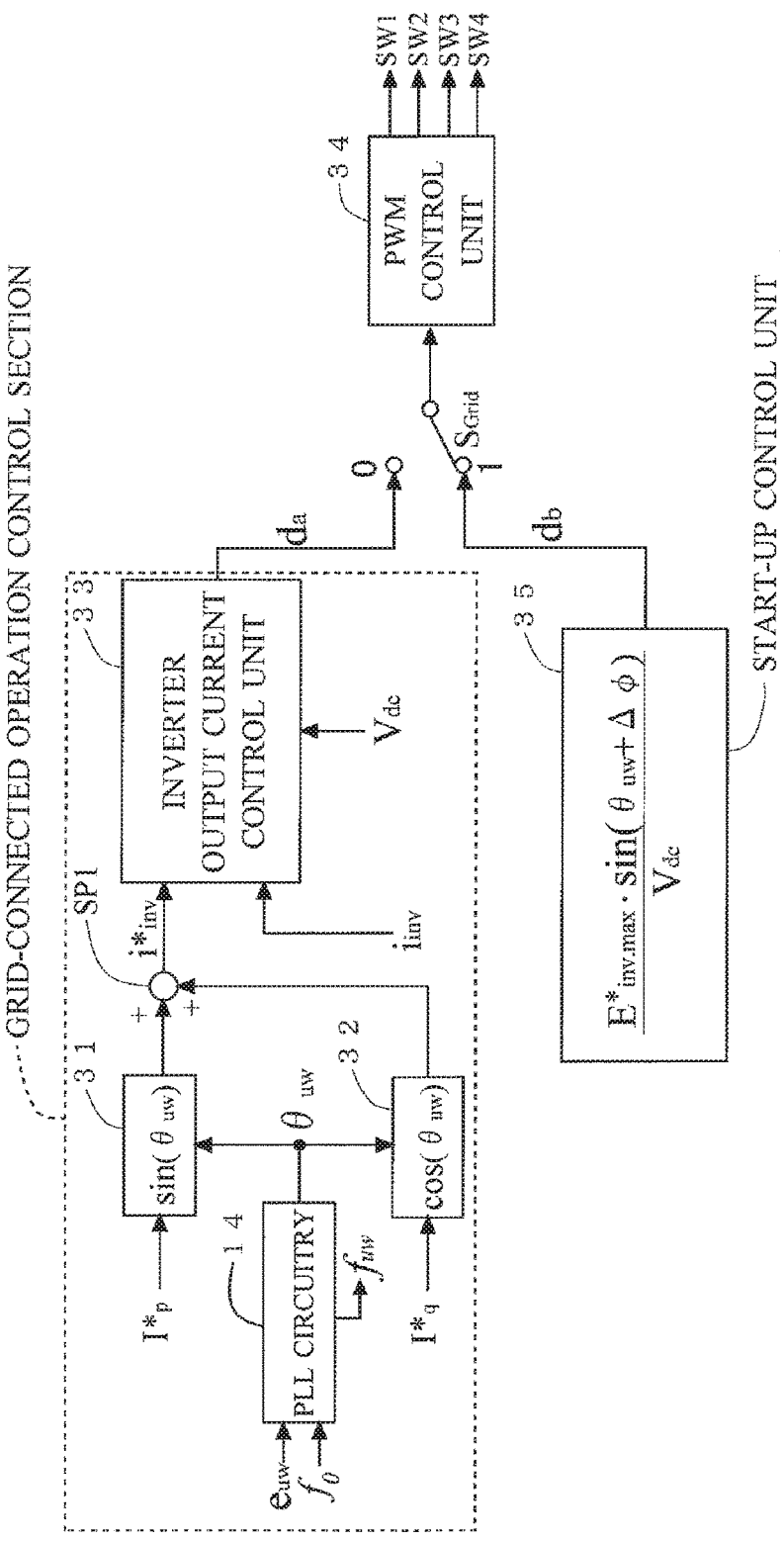
FIG. 2 is a schematic block diagram showing an outline of control of the power conditioner.

FIG. 2 is a schematic block diagram showing an outline of control of the control circuitry 7 of the power conditioner 1. FIG. 2 shows a grid-connected operation control section and a start-up control unit 35. The control circuitry 7 of the power conditioner 1 controls an output current from the inverter 5 for active and reactive components in grid-connected operation of the power conditioner 1 (when a switch $S_{Grid}$ is in position 0), and controls an AC output voltage from the inverter 5 at start-up of the power conditioner 1 (when the switch $S_{Grid}$ is in position 1). As shown in FIG. 2, the grid-connected operation control section comprises an active component (sin($\theta_{uw}$)) generation unit 31, a reactive component (cos($\theta_{uw}$)) generation unit 32 and an inverter output current control unit 33.

In the grid-connected operation with the switch $S_{Grid}$ in position 0, the active component generation unit 31 multiplies an output current command value $I^*_p$ for the active component and a sine value sin($\theta_{uw}$) of the phase angle $\theta_{uw}$ of the commercial system voltage $e_{uw}$ output from the PLL circuitry 14 to generate an instantaneous output value of the output current command value $I^*_p$ for the active component. On the other hand, the reactive component generation unit 32 multiplies an output current command value $I^*_q$ for the reactive component and a cosine value cos($\theta_{uw}$) of the phase angle $\theta_{uw}$ of the commercial system voltage $e_{uw}$ output from the PLL circuitry 14 to generate an instantaneous output value of the output current command value $I^*_p$ for the reactive component. Note that as shown in FIG. 2, $f_0$ represents a fundamental frequency input to the PLL circuitry 14, while $f_{uw}$ represents a commercial system frequency obtained by the PLL circuitry 14.

The instantaneous output value from the active component generation unit 31 and the instantaneous output value from the reactive component generation unit 32 are summed at a summing point SP1 to produce an output current command value $i^*_{inv}$ for the inverter 5. The output current command value $i^*_{inv}$ and an output current $i_{inv}$ from the inverter 5 as a feedback value are sent to the inverter output current control unit 33. The inverter output current control unit 33 performs a feedback control such that the value of the output current $i_{inv}$ from the inverter 5 matches or follows the output current command value $i^*_{inv}$, so as to calculate a duty ratio $d_a$ of PWM control for the grid-connected operation. The duty ratio $d_a$ is input to the PWM control unit 34. Based on the input duty ratio $d_a$, the PWM control unit 34 generates a PWM signal having a pulse width corresponding to the duty ratio $d_a$. This PWM signal is used to control the on/off of each of the switches SW1, SW2, SW3 and SW4 of the inverter 5.

Figure 3:
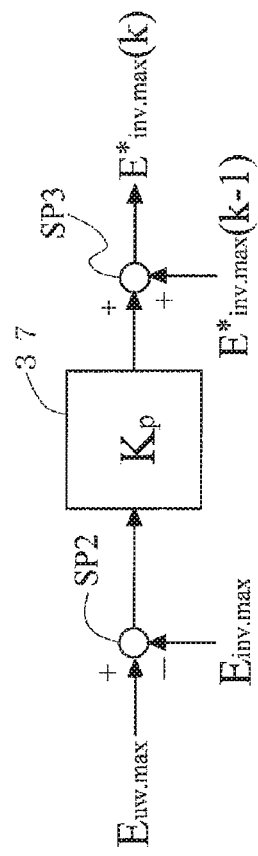
FIG. 3 is a schematic block diagram showing an amplitude adjustment control of an output voltage from the inverter, which the power conditioner performs at or after its start-up.

Referring again to FIG. 2, when the switch $S_{Grid}$ is in position 1, the control circuitry 7 controls the AC output voltage from the inverter 5 at start-up of the power conditioner 1. More specifically, the start-up control unit 35 of the control circuitry 7 uses the following Equation (1) to calculate a duty ratio $d_b$ of PWM control for the start-up. In Equation (1), $E^*_{inv.max}$ represents a command value of the maximum value of the output voltage (amplitude of the output voltage) from the inverter 5, while $\Delta\varphi$ is a threshold of the phase angle which is newly introduced to provide a difference between the phase angle of the output voltage from the inverter 5 and the phase angle $\theta_{uw}$ of the commercial system voltage $e_{uw}$. Further, $V_{dc}$ in Equation (1) represents a value of the DC bus voltage detected by the control circuitry 7. The command value $E^*_{inv.max}$ of the maximum value of the output voltage from the inverter 5 is calculated in a process of amplitude adjustment control of the output voltage from the inverter 5 as shown in FIG. 3. The phase angle $\theta_{uw}$ of the commercial system obtained by the PLL circuitry 14 is used as the phase angle $\theta_{uw}$ in Equation (1). Such use of the phase angle $\theta_{uw}$ of the commercial system voltage $e_{uw}$ obtained by the PLL circuitry 14 makes it possible to provide a slight phase difference ($\Delta\varphi$) between the phase angle of the output voltage from the inverter 5 and the phase angle $\theta$ of the commercial system voltage $e_{uw}$.

$$d_b = \frac{E^*_{inv.max}\sin(\theta_{uw} + \Delta\phi)}{V_{dc}} \quad (1)$$

Based on the duty ratio $d_b$ calculated by the start-up control unit 35 of the control circuitry 7, the PWM control unit 34 generates a PWM signal having a pulse width corresponding to the duty ratio $d_b$. This PWM signal is used to control the on/off of each of the switches SW1, SW2, SW3 and SW4 of the inverter 5. Thus, at start-up of the power conditioner 1, the amplitude of the output voltage from the inverter 5 substantially matches or follows the command value $E^*_{inv.max}$ of the maximum value (amplitude) of the output voltage from the inverter 5. The power conditioner 1 of the present exemplary embodiment uses a start-up control method in which in order to prevent or reduce an inrush current to a capacitor $C_f$ on the output side of the inverter 5 at its start-up, the power conditioner 1 adjusts the amplitude of the output voltage from the inverter 5 to match or follow the amplitude of the commercial system voltage before shifting to the grid-connected operation, and thereafter smoothly shifts to the grid-connected operation control.

FIG. 3 is a schematic block diagram showing an amplitude adjustment control block of an output voltage from the inverter 5, which the control circuitry 7 (mainly the amplitude adjustment circuitry 12) performs in a feedback control of the output voltage from the inverter 5 at or after its start-up. More specifically, this amplitude adjustment control block controls to adjust the maximum value $E_{inv.max}$ of the output voltage (amplitude of the output voltage) from the inverter 5 to match a maximum value $E_{uw.max}$ of the commercial system voltage $e_{uw}$ (amplitude of the commercial system voltage $e_{uw}$). Note that in the following description, the output voltage from the inverter 5 will be referred to as inverter output voltage.

In FIG. 3, $E_{uw.max}$ is the maximum value (amplitude) of the commercial system voltage $e_{uw}$, and $E_{inv.max}$ is the maximum value (amplitude) of the inverter output voltage, while $E^*_{inv.max}$(k−1) is a command value of the maximum value $E_{inv.max}$ of the inverter output voltage in a sampling period preceding (immediately preceding) the k-th sampling period. Note that (k) represents a value in the k-th sampling period which means the current (present) value, while (k−1) represents a value in the sampling period preceding the k-th sampling period, that is, a value preceding the current value. Also note that the sampling period in the present exemplary embodiment is an inverse of a switching frequency.

First, the control circuitry 7 (mainly the amplitude adjustment circuitry 12) of the power conditioner 1 sets, to 0, both the initial value of the maximum value $E_{inv.max}$ of the inverter output voltage $e_{inv}$ and the initial value of the preceding command value $E^*_{inv.max}$(k−1) of the maximum value $E_{inv.max}$ of the inverter output voltage $e_{inv}$. Then, the control circuitry 7 subtracts, at a summing point SP2, the maximum value $E_{inv.max}$ (current (present) maximum value expressible as $E_{inv.max}$(k) as well) of the inverter output voltage $e_{inv}$ in a specific sampling period (k-th or current sampling period) from the maximum value (amplitude) $E_{uw.max}$ of the commercial system voltage $e_{uw}$ (as detected by the commercial voltage amplitude detection circuitry 11) in the same specific sampling period to obtain a difference value between the two values. As shown in FIG. 3, the control circuitry 7 comprises a proportional control unit ($K_p$) 37 which multiplies the difference value by a proportional gain $K_p$ to output an output value (product of the multiplication) to a summing point SP3. Here, a positive value (such as 0.01) which is much lower than 1 is used as the proportional gain $K_p$.

Next, the control circuitry 7 sums the output value from the proportional control unit 37 at the summing point SP3 with the command value $E^*_{inv.max}$(k−1) of the maximum value $E_{inv.max}$ of the inverter output voltage $e_{inv}$ in the (k−1)th sampling period (such command value $E^*_{inv.max}$(k−

1) may hereafter be referred to as preceding command value $E^*_{inv.max}(k-1)$ as well) preceding the specific sampling period (k-th or current sampling period) so as to calculate a command value $E^*_{inv.max}(k)$ of the maximum value $E_{inv.max}$ of the inverter output voltage $e_{inv}$ as the current command value $E^*_{inv.max}(k)$. The thus calculated current command value $E^*_{inv.max}(k)$ is used as the command value of the maximum value of the inverter output voltage in the above Equation (1).

The use of a positive value much lower than 1 as the proportional gain $K_p$ as described above can increase the preceding command value $E^*_{inv.max}(k-1)$ of the maximum value $E_{inv.max}$ of the inverter output voltage $e_{inv}$ stepwise from 0 by repeating the summation, making it possible to adjust the maximum value (amplitude) $E_{inv.max}$ of the inverter output voltage $e_{inv}$ to gradually match or follow the maximum value (amplitude) $E_{uw.max}$ of the commercial system voltage $e_{uw}$. By using such a method of setting both the initial values of $E_{inv.max}$ and $E^*_{inv.max}(k-1)$ to 0 and then stepwise adjusting the maximum value (amplitude) $E_{inv.max}$ of the inverter output voltage $e_{inv}$ to gradually match maximum value (amplitude) $E_{uw.max}$ of the commercial system voltage $e_{uw}$ as described above, a soft start effect (to start the operation or control with a soft start) at start-up of the power conditioner 1 can be obtained.

The following Equations (2) to (4) are used to calculate the maximum value $E_{inv.max}$ of the inverter output voltage $e_{inv}$ and the maximum value $E_{uw.max}$ of the commercial system voltage $e_{inv}$. In these Equations, $T_{uw}$ and $f_{uw}$ are the period and frequency of the commercial system voltage $e_{uw}$, respectively.

$$E_{inv \cdot max} = \sqrt{\frac{4}{T_{uw}} \int_0^{\frac{T_{uw}}{2}} e_{inv}^2(t)dt} \quad (2)$$

$$E_{uw \cdot max} = \sqrt{\frac{4}{T_{uw}} \int_0^{\frac{T_{uw}}{2}} e_{uw}^2(t)dt} \quad (3)$$

$$T_{uw} = \frac{1}{f_{uw}} \quad (4)$$

According to the present exemplary embodiment, the power conditioner 1 can be smoothly started up, because at or after start-up of the power conditioner 1, the method of amplitude adjustment control shown in FIG. 3 is used to adjust the maximum value (amplitude) $E_{inv.max}$ of the inverter output voltage $e_{inv}$, and the phase angle adjustment circuitry 15 of the control circuitry 7 adjusts the phase angle of the inverter output voltage, using the above Equation (1), to allow a phase difference between the phase angle of the inverter output voltage and the phase angle $\theta_{uw}$ of the commercial system voltage $e_{uw}$ detected by the PLL circuitry 14 to have a certain value ($\Delta \varphi$). Here, the phrase "can be smoothly started up" means that an abrupt increase in the maximum value (amplitude) $E_{inv.max}$ of the output voltage from the inverter 5 can be avoided at start-up of the power conditioner 1.

Next, referring to the flow chart of FIG. 4, a flow of a control process of the power conditioner 1 according to the present exemplary embodiment at its start-up will be described. Before connection to the commercial power system (grid) 3, the control circuitry 7 (mainly the start-up control circuitry 13) of the power conditioner 1 switches the switch $S_{GRID}$ to position 1, and turns off each of the grid connection relays $S_u$, $S_w$ to perform a control process shown in FIG. 3 so as to adjust the amplitude of the inverter output voltage $e_{inv}$ to match the amplitude of the commercial system voltage $e_{uw}$ (step S1). When a predetermined time from the start of the amplitude adjustment process of step S1 above has elapsed (YES in step S2), and the amplitude of the inverter output voltage $e_{inv}$ reaches the amplitude of the commercial system voltage $e_{uw}$, the control circuitry 7 (mainly the start-up control circuitry 13 and the disconnection/welding detection circuitry 16) of the power conditioner 1 turns the grid connection relays $S_u$, $S_w$ on and off as shown in FIG. 5 below to detect disconnection and welding of the grid connection relays $S_u$ and $S_w$ (step S3 in FIG. 4).

This will be described in detail below with reference to FIG. 5, which is a schematic chart showing an on/off switching of the grid connection relays $S_u$, $S_w$ in a disconnection/welding detection process of each of the grid connection relays $S_u$, $S_w$. Referring to FIG. 5, in period (1), with both grid connection relays $S_u$, $S_w$ turned off, the control circuitry 7 detects whether both grid connection relays $S_u$, $S_w$ are welded. Further, in period (2), with the grid connection relay $S_w$ kept turned off, the control circuitry 7 turns only the grid connection relay $S_u$ on, and detects whether the grid connection relay $S_w$ is welded. Further, in period (3), when a predetermined time $T_{dly}$ elapses from the end of period (2), the control circuitry 7 turns the grid connection relay $S_u$ off and the grid connection relay $S_w$ on, and detects whether the grid connection relay $S_u$ is welded. Furthermore, in period (4), when a predetermined time $T_{dly}$ elapses from the end of period (3), the control circuitry 7 detects, with both grid connection relays $S_u$, $S_w$ turned on, whether the grid connection relay $S_u$ or the grid connection relay $S_w$ is disconnected.

Next, a specific disconnection/welding detection process of the grid connection relays $S_u$, $S_w$ will be described. First, based on a value of the inverter output voltage $e_{inv}$ detected by the output voltage value detection circuitry 21, the control circuitry 7 (its passing current value estimation circuitry 19) estimates (calculates) a value of a current $i_c$ (hereafter referred to as capacitor-passing current) flowing through the capacitor $C_f$, using the following Equation (5). Subsequently, the control circuitry 7 (its system output current value calculation circuitry 20) calculates a value of an output current $i_{sp}$ from the power conditioner 1, using the following Equation (6), based on the value of the inverter output current $i_{inv}$ detected by the output current value detection circuitry 18 and the value of the capacitor-passing current $i_c$ calculated by using Equation (5).

Figure 4:
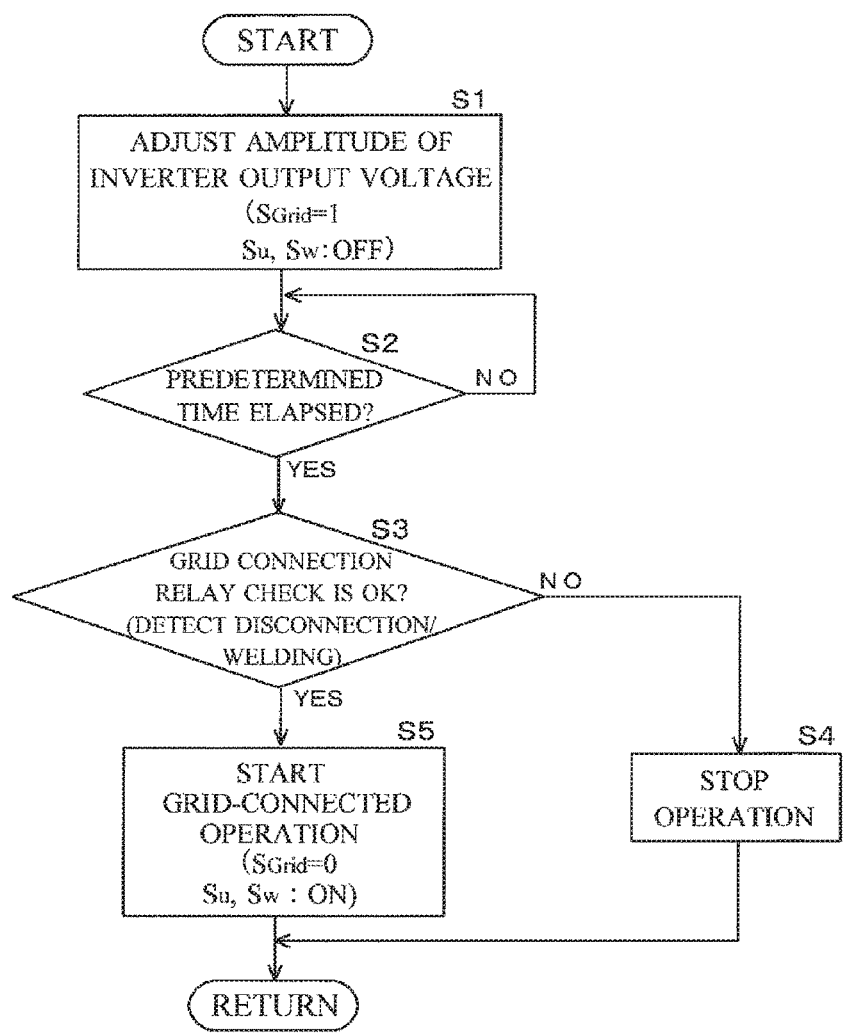
FIG. 4 is a flow chart of a control process of the power conditioner at its start-up.
Figure 5:
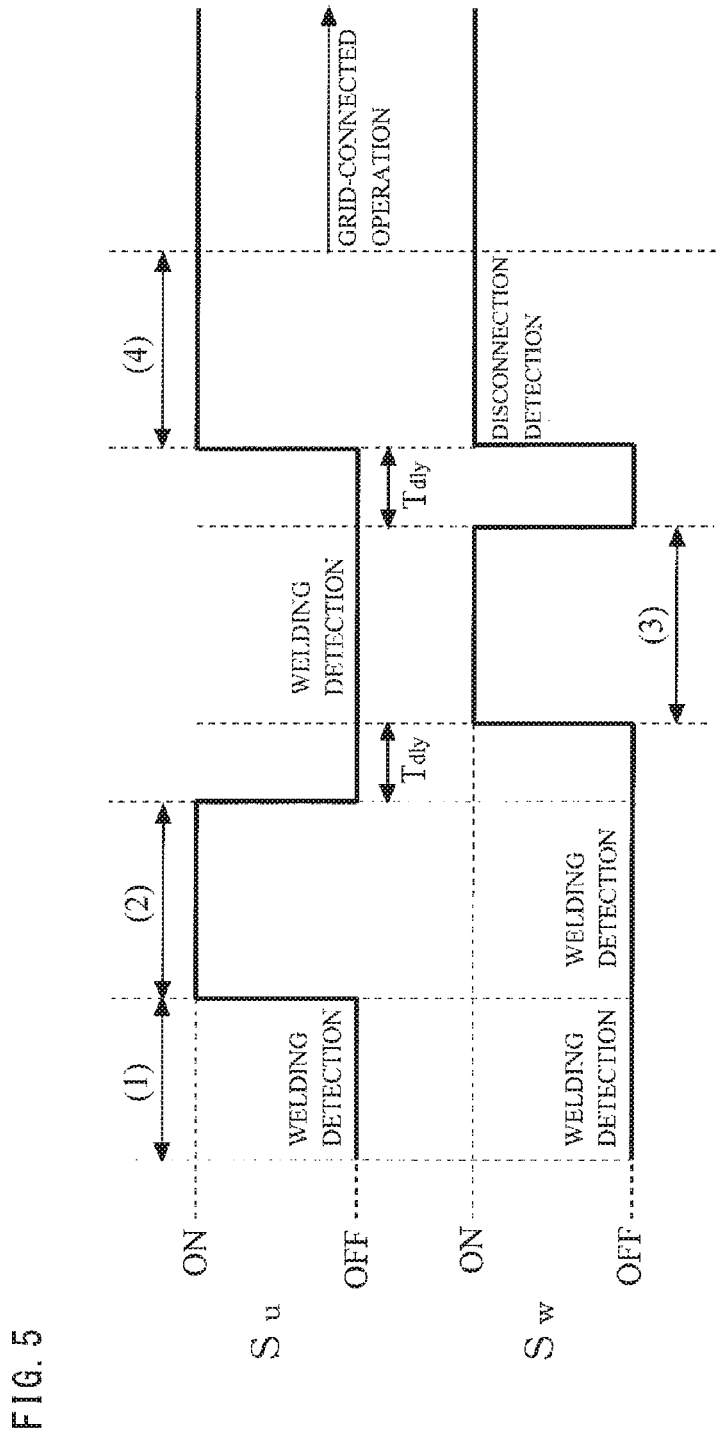
FIG. 5 is a schematic chart showing an on/off switching of grid connection relays of the power conditioner in a disconnection/welding detection process of each grid connection relay.
Figure 6:
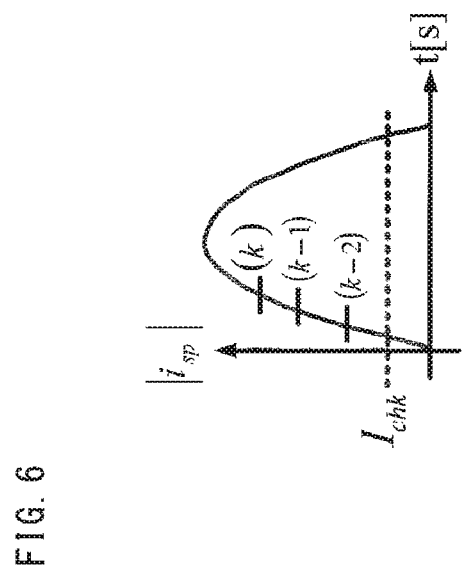
FIG. 6 is a graph showing a method to determine disconnection/welding of the grid connection relays.

For detection of whether both grid connection relays $S_u$, $S_w$ are welded in period (1) in FIG. 5, the control circuitry 7 (its disconnection/welding detection circuitry 16) determines that welding occurs in both grid connection relays $S_u$, $S_w$, if an absolute value $|i_{sp}|$ of the output current $i_{sp}$ calculated by Equation (6) is equal to or more than a threshold $I_{chk}$ calculated by the following Equation (7). On the other hand, for detection of whether only one of the grid connection relays $S_u$, $S_w$ (which is turned off) is welded in periods (2) and (3) in FIG. 5, the control circuitry 7 (its system output current value calculation circuitry 20) repeatedly calculates the absolute value $|i_{sp}|$ of the output current $i_{sp}$, and the control circuitry 7 (its disconnection/welding detection circuitry 16) determines that welding occurs in only one of the grid connection relays $S_u$, $S_w$, if the absolute values $|i_{sp}|$ of the output current $i_{sp}$ calculated multiple times in the past such as three times in the past are all equal to or more than the threshold $I_{chk}$ calculated by the following Equation (7), and if such calculated absolute values $|i_{sp}|$ continuously increase as shown in FIG. 6. Then, if, in period (1), (2) or (3), the control circuitry 7 determines that welding occurs in the grid connection relay $S_u$ and/or the grid connection relay $S_w$ (NO in step S3 in FIG. 4), the control circuitry 7 stops the operation of the power conditioner 1 (step S4 in FIG. 4). Note that a detailed description of the following Equation (5) is omitted because it is well known as a transfer function of an RC (resistor-capacitor) series circuit in the field of control engineering.

$$i_c = \frac{sC_f}{sR_cC_f + 1} \cdot e_{inv} \quad (5)$$

$$i_{sp} = i_{inv} - i_c \quad (6)$$

$$I_{chk} = \frac{2\pi f_{uw} C_f E_{uw\cdot max}}{x} \quad (7)$$

The numerator $(2\pi f_{uw} C_f E_{uw.max} = (\omega_{uw} C_f E_{uw.max}))$ of the above Equation (7) to calculate the threshold $I_{chk}$ shows a maximum value of the current (capacitor-passing current) $i_c$ flowing through the capacitor $C_f$ when the grid connection relays $S_u$, $S_w$ are turned on. Note that x in Equation (7) is a factor to set the threshold $I_{chk}$ for detection level. It is considered that the value of this factor should be set to x>1.

Now, the reason why, in periods (2) and (3) in FIG. 5, the continuous increase of the absolute values $|i_{sp}|$ of the output current $i_{sp}$ calculated multiple times in the past is used as a condition to determine the welding of the grid connection relays $S_u$, $S_w$ is as follows. If, in periods (2) and (3) in FIG. 5, one of the grid connection relays $S_u$, $S_w$ (which is turned off for welding detection) is welded, the inverter 5 is connected to the commercial power system 3 when the other of the grid connection relays is turned on, and therefore, an inrush current to the capacitor $C_f$ occurs (at the moment when the inverter 5 is connected to the commercial power system 3) due to the phase difference $\Delta\varphi$ between the inverter output voltage $e_{inv}$ and the commercial system voltage $e_{uw}$, and thus, an abrupt increase in the current value of the output current $i_{sp}$ from the power conditioner 1 occurs mainly due to the inrush current to the capacitor $C_f$.

In contrast, the reason why, in period (1) in FIG. 5, the continuous increase of the absolute values $|i_{sp}|$ of the output current $i_{sp}$ is not used as a condition to determine the occurrence of welding of the grid connection relays $S_u$, $S_w$ while only that the absolute value $|i_{sp}|$ of the output current $i_{sp}$ is equal to or more than the threshold $I_{chk}$ is used as a condition to determine the occurrence of welding of the grid connection relays $S_u$, $S_w$ is as follows. If welding occurs in both of the grid connection relays $S_u$, $S_w$, the inverter 5 is already connected to the commercial power system 3 before period (1) begins, and therefore, an abrupt increase in the current value of the output current $i_{sp}$ mainly due to the inrush current to the capacitor $C_f$ does not occur at the moment of the beginning of period (1).

Referring back to the flow chart of FIG. 4, if, in period (4) in FIG. 5, the output current $i_{sp}$ from the power conditioner 1 as calculated by the above Equations (5) and (6) is less than the threshold $I_{chk}$ calculated by Equation (7), the control circuitry 7 (its disconnection/welding detection circuitry 16) determines that disconnection occurs in at least one of the grid connection relays $S_u$, $S_w$ (NO in step S3 in FIG. 4), and stops the power conditioner 1 (step S4 in FIG. 4).

A summary of the disconnection/welding detection process described above is that before starting the grid-connected operation, the control circuitry 7 (its disconnection/welding detection circuitry 16) detects disconnection of the grid connection relays $S_u$, $S_w$ based on a value of the output current $i_{sp}$ calculated by the system output current value calculation circuitry 20, with the grid connection relays $S_u$, $S_w$ turned on (that is, when the grid connection switch is switched to a connected state), and also detects welding of the grid connection relays $S_u$, $S_w$ based on the value of the output current $i_{sp}$ calculated by the system output current value calculation circuitry 20, with the grid connection relays $S_u$, $S_w$ turned off (that is, when the grid connection switch is switched to a disconnected state).

Note here that a power conversion device to detect welding of an isolated power system relay is described in Japanese Laid-open Patent Publication 2014-064415 as discussed in the Description of the Related Art. However, although the power conversion device described in Japanese Laid-open Patent Publication 2014-064415 can detect welding of the isolated power system relay, it cannot detect disconnection of the isolated power system relay. Further, it may be possible to use the technology of detecting an abnormality of a switching element as described in Japanese Laid-open Patent Publication 2005-318704 to detect welding of the grid connection relays $S_u$, $S_w$. However, in the case of the method as described in this Japanese Laid-open Patent Publication 2005-318704 to detect short circuit (welding) of a switching element (corresponding to the grid connection relays $S_u$, $S_w$) of a power conversion unit (inverter) based on a change rate of an applied voltage to an input capacitor (corresponding to the capacitor $C_f$ in FIG. 1), it is very likely that if a set value of the change rate of the applied voltage to the capacitor (hereafter referred to as "capacitor voltage") which serves as a threshold for short circuit detection is high, the switching element may be broken due to an over current at the moment of the beginning of the short circuit. Conversely, if the set value of the change rate of the capacitor voltage serving as the threshold is low, it becomes very likely that erroneous detection may occur, for example, due to noise.

Referring back to the flow chart of FIG. 4, if, in the disconnection/welding detection process of step S3, the control circuitry 7 does not detect welding or disconnection of the grid connection relays $S_u$, $S_w$ (YES in step S3), the control circuitry 7 (mainly the start-up control circuitry 13) switches the switch $S_{Grid}$ to position 0 and turns the grid connection relays $S_u$, $S_w$ on to start grid-connected operation of the power conditioner 1.

The start-up control method for the power condition 1 according to the present exemplary embodiment described above has two features. The first feature is to use a feedback control to adjust the amplitude $E_{inv.max}$ of the inverter output voltage to gradually match the amplitude $E_{uw.max}$ of the commercial system voltage $e_{uw}$ before connecting the power conditioner 1 to the commercial power system 3. If the power conditioner 1 is connected, immediately after its start-up, to the commercial power system 3, the commercial system voltage $e_{uw}$ is suddenly applied to the capacitor $C_f$ to cause an abrupt increase in the applied voltage to the capacitor $C_f$, and therefore, an inrush current may flow in the capacitor $C_f$.

In contrast, according to the present exemplary embodiment, before connecting itself to the commercial power system 3, the power conditioner 1 controls to adjust the amplitude $E_{inv.max}$ of the inverter output voltage to gradually match the amplitude $E_{uw.max}$ of the commercial system voltage $e_{uw}$, which allows the applied voltage to the capacitor $C_f$ to increase gradually. Therefore, it is possible to eliminate the possibility that an inrush current may flow in the capacitor $C_f$ when the power conditioner 1 is connected to the commercial power system 3. The second feature is to estimate a value of a current (capacitor-passing current) $i_c$ flowing through the capacitor $C_f$, and detect or find a change in an output current $i_{sp}$ from the power conditioner 1 before allowing the power conditioner 1 to start grid-connected operation, so as to check a failure (detect disconnection/welding) of the grid connection relays $S_u$, $S_w$.

According to the power conditioner 1 of the present exemplary embodiment, the use of the start-up control method described above can prevent or reduce an inrush current to the capacitor $C_f$ provided between the inverter 5 and the commercial power system 3 at start-up of the power conditioner 1 without using a conventional inrush current prevention circuitry. In addition, it is possible to reliably detect disconnection and welding of the grid connection relays $S_u$, $S_w$ before the power conditioner 1 is connected to the commercial power system 3.

In order to confirm the effect of the start-up control method described above, the grid connection relay $S_w$ was welded, and an experiment at start-up of the power conditioner 1 was conducted with the grid connection relay $S_w$ welded. Note that in normal operation, if the grid connection relay $S_w$ is welded, the operation of the power conditioner 1 is stopped and prevented from shifting to the grid connected operation as shown in FIG. 4. However, in this experiment, after welding of the grid connection relay $S_w$ was detected, the operation of the power conditioner 1 was intentionally shifted to the grid-connected operation, and then the occurrence of inrush current to the capacitor $C_f$ when using the start-up control method was checked. In short, the purpose of this experiment at start-up of the power conditioner 1 is to determine, at the same time, the effect of reducing inrush current to the capacitor $C_f$ and the effect of checking disconnection/welding of the grid connection relays $S_u$, $S_w$ when using the start-up control method described above.

Figure 7:
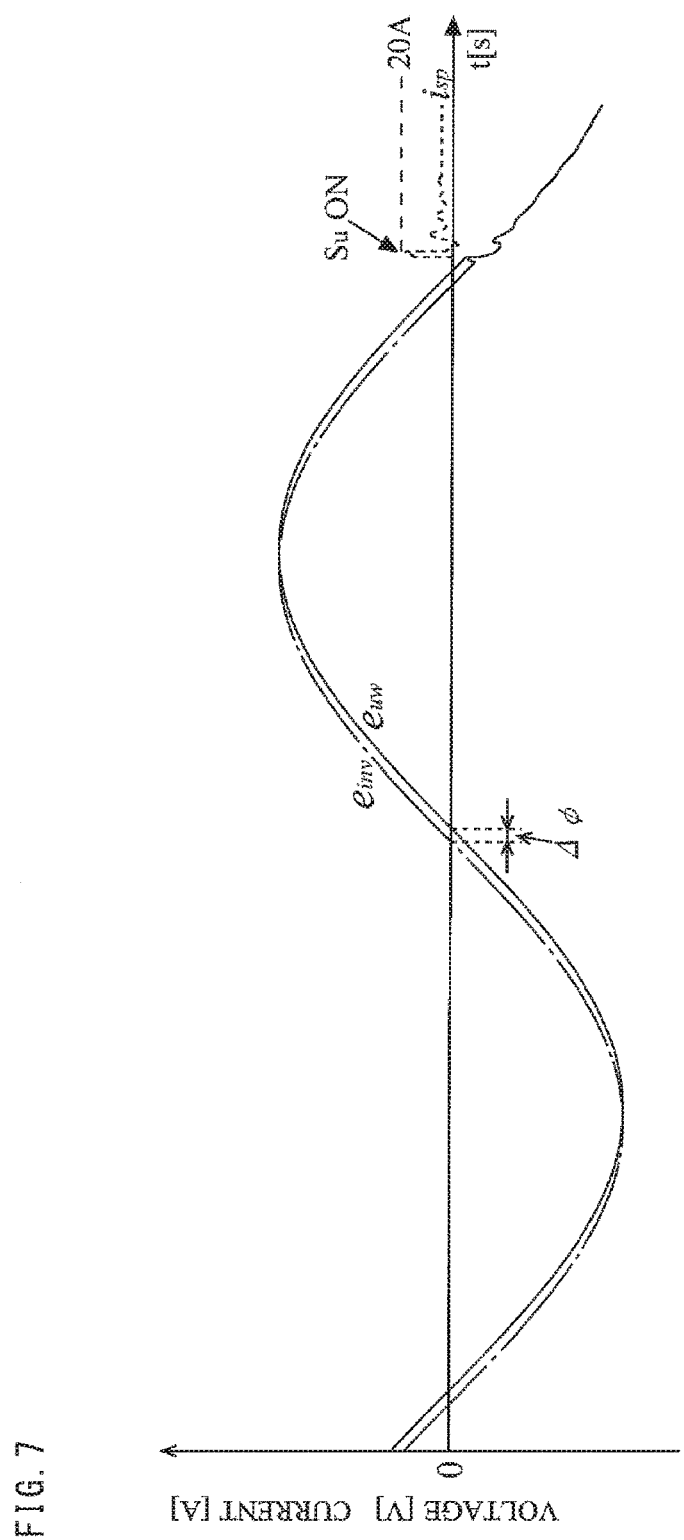
FIG. 7 is a graph showing results of an experiment conducted at start-up of the power conditioner with one of the grid connection relays welded.

FIG. 7 is a graph showing results of this experiment conducted at start-up of the power conditioner 1 with the grid connection relay $S_w$ welded. FIG. 7 shows an inverter output voltage $e_{inv}$ and a commercial system voltage $e_{uw}$ in the power conditioner 1 using the start-up control method described above immediately before it is connected to the commercial power system 3, and also shows the occurrence of inrush current to the capacitor $C_f$ when the grid-connected operation of the power conditioner 1 is started. In FIG. 7, the one-dot chain curve shows the inverter output voltage $e_{inv}$, and the solid curve shows the commercial system voltage $e_{uw}$, while the dashed curve shows an output current $i_{sp}$ from the power conditioner 1. Note that in FIG. 7, the vertical axis represents voltage (V) and current (A), while the horizontal axis represents time t (sec).

According to this experiment, as shown in FIG. 7, the output current $i_{sp}$ from the power conditioner 1 became a spike-like inrush current at the moment when the grid connection relays $S_u$, $S_w$ were turned on. Here, the reason for the generation of the spike-like inrush current is because of a phase difference $\Delta\varphi$ (set to 200 μs in this experiment which corresponds to about 4.32°) given between the inverter output voltage $e_{inv}$ and the commercial system voltage $e_{uw}$. Thus, at the moment when the grid connection relays $S_u$, $S_w$ are turned on, a difference between the commercial system voltage $e_{uw}$ and an AC voltage applied to the capacitor $C_f$, which is due to the phase difference $\Delta\varphi$ between the inverter output voltage $e_{inv}$ and the commercial system voltage $e_{uw}$, causes a current to flow in the capacitor $C_f$, consequently causing an instantaneous inrush current. Note here that since the phase difference $\Delta\varphi$ is set to a small value as described above, the instantaneous inrush current generated has a value of up to 20 A. This level of instantaneous inrush current generated does not exceed a maximum allowable current of the switching elements SW1 to SW4 of the inverter 5, and therefore, the entire power conditioner 1 including the inverter 5 operates normally in spite of the inrush current. In addition, in the experiment, welding of the grid connection relay $S_w$ could be detected.

As a result of the experiment, it could be confirmed that it was possible to reduce an inrush current to the capacitor $C_f$ by using the method of amplitude and phase adjustment control shown in FIG. 2 and FIG. 3 to adjust the amplitude and phase of the output voltage from the inverter 5 at start-up of the power conditioner 1. In addition, it could be confirmed that it was possible to detect welding of the grid connection relay by the disconnection/welding detection process of the grid connection relay.

As described above, according to the power conditioner 1 of the present exemplary embodiment, the amplitude $E_{inv.max}$ of the inverter output voltage $e_{inv}$ from the inverter 5 is increased stepwise from 0 to adjust the amplitude $E_{inv/max}$ of the inverter output voltage $e_{inv}$ from the inverter 5 to match the amplitude $E_{uw.max}$ of the commercial system voltage $e_{uw}$ detected by the commercial voltage amplitude detection circuitry 11 after (immediately after) the start-up of the power conditioner 1, and thereafter the inverter 5 is connected to the commercial power system 3 to start the grid-connected operation of the power conditioner 1. Thus, the voltage applied to the capacitor $C_f$ provided between the inverter 5 and the commercial power system 3 can be prevented from abruptly increasing from 0V to the commercial system voltage $e_{uw}$ at start-up of the power conditioner 1. This makes it possible to reduce an inrush current to the capacitor $C_f$ provided between the inverter 5 and the commercial power system 3 at start-up of the power conditioner 1 without using an inrush current prevention circuitry.

Further, according to the power conditioner 1 of the present exemplary embodiment, the control circuitry 7 (its start-up control circuitry 13) controls to connect the inverter 5 to the commercial power system 3 to start the grid-connected operation, after the phase angle adjustment circuitry 15 adjusts the phase angle of the inverter output voltage $e_{inv}$ after start-up of the power conditioner 1 to allow a phase difference between the phase angle of the inverter output voltage $e_{inv}$ and the phase angle of the commercial system voltage $e_{uw}$ detected by the PLL circuitry 14 to have a certain value ($\Delta\varphi$). Thus, the inverter 5 can be connected to the commercial power system 3 to start the grid-connected operation, after not only the amplitude but also the phase angle of the inverter output voltage $e_{inv}$ is adjusted by using the phase angle $\theta_{uw}$ of the commercial system voltage $e_{uw}$. This makes it possible to further reduce the change in the voltage applied to the capacitor $C_f$ provided between the inverter 5 and the commercial power system 3 when the power conditioner 1 is connected to the commercial power system 3, and therefore, the inrush current to the capacitor $C_f$ can be further reduced.

Further, according to the power conditioner 1 of the present exemplary embodiment, before it starts the grid-connected operation, it detects disconnection of the grid connection relays $S_u$, $S_w$ based on the value of the output current $i_{sp}$ calculated by the system output current value calculation circuitry 20, with the grid connection relays $S_u$, $S_w$ turned on (that is, when the grid connection switch is switched to a connected state), and also detects welding of the grid connection relays $S_u$, $S_w$ based on the value of the output current $i_{sp}$ calculated by the system output current value calculation circuitry 20, with the grid connection relays $S_u$, $S_w$ turned off (that is, when the grid connection switch is switched to a disconnected state). Thus, disconnection and welding of the grid connection relays $S_u$ and $S_w$ can be detected before starting the grid-connected operation of the power conditioner 1.

MODIFIED EXAMPLES

It is to be noted that the present invention is not limited to the above-described exemplary embodiment, and various modifications are possible within the spirit and scope of the present invention. Modified examples of the present invention will be described below.

Modified Example 1

Figure 8:
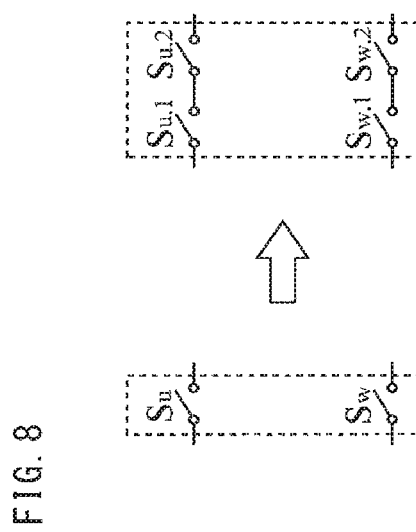
FIG. 8 is a schematic view showing, in the left side, a relay circuitry of grid connection relays in the power conditioner according to the exemplary embodiment, and showing, in the right side, a relay circuitry of grid connection relays and protection relays in a power conditioner according to Modified Example 1 of the present invention.

The above-described exemplary embodiment shows an example where the claimed grid connection switch is a single grid connection switch formed by the grid connection relays $S_u$, $S_w$. However, the claimed grid connection switch is not limited thereto, and can be a dual grid connection switch formed by grid connection relays $S_{u.1}$, $S_{w.1}$ and protection relays $S_{u.2}$, $S_{w.2}$ as shown in FIG. 8, which is a schematic view showing, in the left side, a relay circuitry of the grid connection relays $S_u$, $S_w$ in the power conditioner 1 according to the exemplary embodiment, and showing, in the right side, a relay circuitry of the grid connection relays $S_{u.1}$, $S_{w.1}$ and the protection relays $S_{u.2}$, $S_{w.2}$ in a power conditioner 1 according to Modified Example 1 of the present invention. Note here that generally, a grid connection relay and a protection relay are required to be provided in a power conversion device for grid connection according to the regulations in each country for grid connection. The protection relay is a relay designed so that when a failure in, for example, a distributed power supply or a grid fault occurs, it removes the failure or the grid fault, or limits the area of the failure or the grid fault.

Also if the grid connection switch is the dual one formed by the grid connection relays $S_{u.1}$, $S_{w.1}$ and the protection relays $S_{u.2}$, $S_{w.2}$ as described above, a process similar to the disconnection/welding detection process in the above-described exemplary embodiment can be used to detect disconnection/welding of the protection relays $S_{u.2}$, $S_{w.2}$ by turning the protection relays $S_{u.2}$, $S_{w.2}$ on and off in a procedure similar to FIG. 5, with the grid connection relays $S_{u.1}$, $S_{w.1}$ turned on. The process similar to the disconnection/welding detection process in the above-described exemplary embodiment can also be used to detect disconnection/welding of the grid connection relays $S_{u.1}$, $S_{w.1}$ by turning the grid connection relays $S_{u.1}$, $S_{w.1}$ on and off in a procedure similar to FIG. 5, with both protection relays $S_{u.2}$, $S_{w.2}$ turned on.

Modified Example 2

According to the above-described exemplary embodiment, in the disconnection/welding detection process of the grid connection relays $S_u$, $S_w$, the passing current value estimation circuitry 19 calculates a value of a capacitor-passing current $i_c$ flowing through the capacitor $C_f$ using the above-described Equation (5), based on a value of an inverter output voltage $e_{inv}$ detected by the output voltage value detection circuitry 21 so as to estimate the value of the capacitor-passing current $i_c$. However, instead, it is also possible to prepare a LUT (Look-UP Table) associating values of the inverter output voltage $e_{inv}$ with values of the capacitor-passing current $i_c$, and store the LUT in a memory of the control circuitry 7, so as to allow the control circuitry 7 to refer to the LUT to estimate a value of the capacitor-passing current $i_c$ flowing through the capacitor $C_f$.

Modified Example 3

According to the above-described exemplary embodiment, for detection of whether only one of the grid connection relays $S_u$, $S_w$ is welded in periods (2) and (3) in FIG. 5, the system output current value calculation circuitry 20 repeatedly calculates the absolute value $|i_{sp}|$ of the output current $i_{sp}$ from the power conditioner 1, with the one of the grid connection relays $S_u$, $S_w$ turned off (switched to a disconnected state), and determines (detects) that welding occurs in the one of the grid connection relays $S_u$, $S_w$, if the absolute values $|i_{sp}|$ of the output current $i_{sp}$ calculated multiple times in the past are all equal to or more than a predetermined threshold $T_{chk}$, and if such calculated absolute values $|i_{sp}|$ continuously increase. However, the welding detection process is not limited thereto. For example, similarly as in period (1) in FIG. 5, it is also possible to directly determine, in periods (2) and (3), that welding occurs in the one of the grid connection relays $S_u$, $S_w$, if an absolute value $|i_{sp}|$ of the output current $i_{sp}$ from the power conditioner 1 is equal to or more than the predetermined threshold $I_{chk}$.

Modified Example 4

According to the above-described exemplary embodiment, in order to detect disconnection and welding of the grid connection relays $S_u$, $S_w$, the control circuitry 7 adjusts the phase angle of the inverter output voltage $e_{inv}$ after (immediately after) start-up of the power conditioner 1 to allow the phase difference between the phase angle of the inverter output voltage $e_{inv}$ and the phase angle of the commercial system voltage $e_{uw}$ detected by the PLL circuitry 14 to have a certain value ($\Delta\varphi$). However, the control circuitry 7 can be designed to allow the start-up control circuitry 13 to control the power conditioner 1 so that after the phase angle adjustment circuitry 15 adjusts the phase angle of the inverter output voltage $e_{inv}$ after (immediately after) the start-up of the power conditioner 1, so as to allow the above-described phase difference to have a value within a predetermined range, the start-up control circuitry 13 connects the inverter 5 to the commercial power system to start the grid-connected operation. This configuration can also reduce an inrush current to the capacitor forming the LC filter.

Modified Example 5

The above-described exemplary embodiment shows an example where the claimed "capacitor" is the capacitor $C_f$ forming the LC filter 6. However, the claimed "capacitor" is not limited thereto, and can be any capacitor connected between the inverter and the commercial power system (that is, any capacitor on the output side of the inverter).

Modified Example 6

The above-described exemplary embodiment shows an example where the grid connection power conversion device of the present invention is a power conditioner 1. However, the grid connection power conversion device to which the present invention is applied is not limited thereto, and can be a power conversion device for a hybrid power generation and storage system formed by integrating a power conversion device, a distributed power supply and a power storage device.

Modified Example 7

The above-described exemplary embodiment shows an example where the control circuitry 7 is formed by a so-called microcomputer. However, the control circuitry 7 is not limited thereto, and can be formed by, for example, a system LSI (Large-Scale Integrated circuit).

These and other modifications will become obvious, evident or apparent to those ordinarily skilled in the art, who have read the description. Accordingly, the appended claims should be interpreted to cover all modifications and variations which fall within the spirit and scope of the present invention.

The invention claimed is:

1. A grid connection power conversion device for connecting a distributed power supply to a commercial power system, the grid connection power conversion device comprising:
   an inverter for converting DC power based on power input from the distributed power supply to AC power;
   a capacitor connected between the inverter and the commercial power system;
   a commercial voltage amplitude detection circuitry configured to detect an amplitude of a commercial system voltage which is a voltage of the commercial power system;
   an amplitude adjustment circuitry configured to increase an amplitude of an output voltage from the inverter stepwise from 0 to match the amplitude of the commercial system voltage detected by the commercial voltage amplitude detection circuitry;
   a grid connection switch for switching a connection of the distributed power supply to the commercial power system between a connected state and a disconnected state;
   a disconnection/welding detection circuitry configured to detect disconnection of the grid connection switch, before starting grid-connected operation, based on a value of output current from the grid connection power conversion device, with the grid connection switch switched to the connected state, and also configured to detect welding of the grid connection switch, before starting the grid-connected operation, based on the value of the output current from the grid connection power conversion device, with the grid connection switch switched to the disconnected state; and
   a start-up control circuitry configured to control the grid connection power conversion device so that after the amplitude adjustment circuitry adjusts the amplitude of the output voltage from the inverter, after the start-up of the grid connection power conversion device, to match the amplitude of the commercial system voltage detected by the commercial voltage amplitude detection circuitry, the start-up control circuitry connects the inverter to the commercial power system to start grid-connected operation.

2. The grid connection power conversion device according to claim 1, further comprising:
   a commercial voltage phase angle detection circuitry configured to detect a phase angle of the commercial system voltage; and
   a phase angle adjustment circuitry configured to adjust a phase angle of the output voltage from the inverter to allow a phase difference between the phase angle of the output voltage from the inverter and the phase angle of the commercial system voltage detected by the commercial voltage phase angle detection circuitry to have a value within a predetermined range,
   wherein the start-up control circuitry controls the grid connection power conversion device so that after the phase angle adjustment circuitry adjusts the phase angle of the output voltage from the inverter, after the start-up of the grid connection power conversion device, so as to allow the phase difference to have a value within a predetermined range, the start-up control circuitry connects the inverter to the commercial power system to start the grid-connected operation.

3. The grid connection power conversion device according to claim 1, further comprising:
   an output current value detection circuitry configured to detect a value of an output current from the inverter,
   a passing current value estimation circuitry configured to estimate a value of a capacitor-passing current which is a current flowing through the capacitor, and
   a system output current value calculation circuitry configured to calculate a value of an output current from the grid connection power conversion device based on the value of the output current from the inverter detected by the output current value detection circuitry and the value of the capacitor-passing current estimated by the passing current value estimation circuitry,
   wherein the disconnection/welding detection circuitry detects disconnection and welding of the grid connection switch, based on the value of the output current from the grid connection power conversion device as calculated by the system output current value calculation circuitry.

4. The grid connection power conversion device according to claim 3, further comprising an output voltage value detection circuitry configured to detect a value of the output voltage from the inverter,
   wherein the passing current value estimation circuitry calculates the value of the capacitor-passing current based on the value of the output voltage from the inverter as detected by the output voltage value detection circuitry so as to estimate the value of the capacitor-passing current.

5. The grid connection power conversion device according to claim 4,
   wherein the system output current value calculation circuitry repeatedly calculates the value of the output current from the grid connection power conversion device, with the grid connection switch switched to the disconnected state, and the disconnection/welding detection circuitry detects that welding occurs in the grid connection switch if the values of the output current calculated multiple times in the past are all equal to or more than a predetermined threshold and continuously increase, and
   wherein if the value of the output current calculated by the system output current value calculation circuitry, with the grid connection switch switched to the connected state, is less than the predetermined threshold, the disconnection/welding detection circuitry detects that disconnection occurs in the grid connection switch.

6. The grid connection power conversion device according to claim 3,
   wherein the system output current value calculation circuitry repeatedly calculates the value of the output current from the grid connection power conversion device, with the grid connection switch switched to the disconnected state, and the disconnection/welding detection circuitry detects that welding occurs in the grid connection switch if the values of the output current calculated multiple times in the past are all equal to or more than a predetermined threshold and continuously increase, and wherein if the value of the output current calculated by the system output current value calculation circuitry, with the grid connection switch switched to the connected state, is less than the predetermined threshold, the disconnection/welding detection circuitry detects that disconnection occurs in the grid connection switch.

7. A start-up control method for a grid connection power conversion device comprising: an inverter for converting DC power based on power input from a distributed power supply to AC power; a capacitor connected between the inverter and the commercial power system; and a grid connection switch for switching the connection of the distributed power supply to the commercial power system between a connected state and a disconnected state, the start-up control method comprising the steps of:

increasing an amplitude of an output voltage from the inverter stepwise from 0, after start-up of the grid connection power conversion device, to adjust the amplitude of the output voltage from the inverter to match an amplitude of a commercial system voltage;

detecting disconnection of the grid connection switch, before starting grid-connected operation, based on a value of output current from the grid connection power conversion device, with the grid connection switch switched to the connected state, and also detecting welding of the grid connection switch, before starting the grid-connected operation, based on the value of the output current from the grid connection power conversion device, with the grid connection switch switched to the disconnected state; and thereafter connecting the inverter to the commercial power system to start the grid-connected operation.

* * * * *